No. 730,700. PATENTED JUNE 9, 1903.
J. W. PRIDMORE & B. R. BENJAMIN.
HARVESTER TRUCK.
APPLICATION FILED DEC. 2, 1901.
NO MODEL.
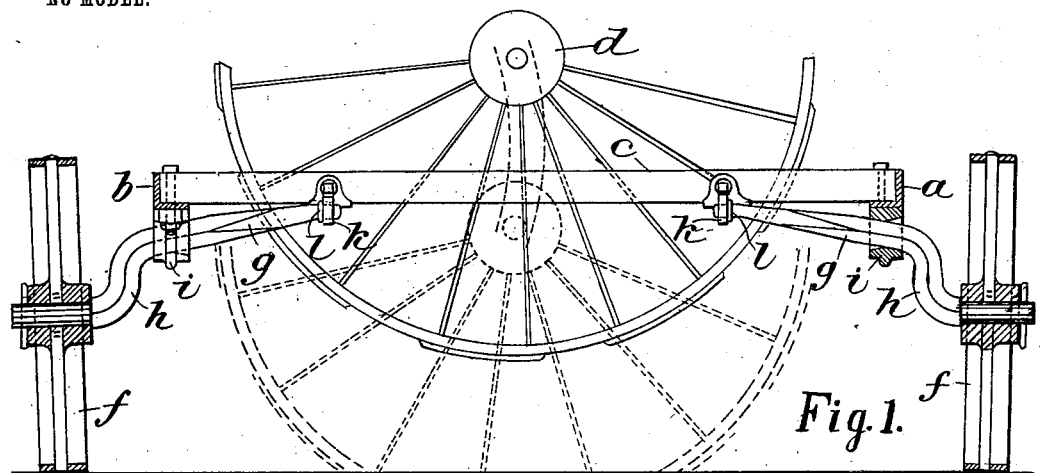
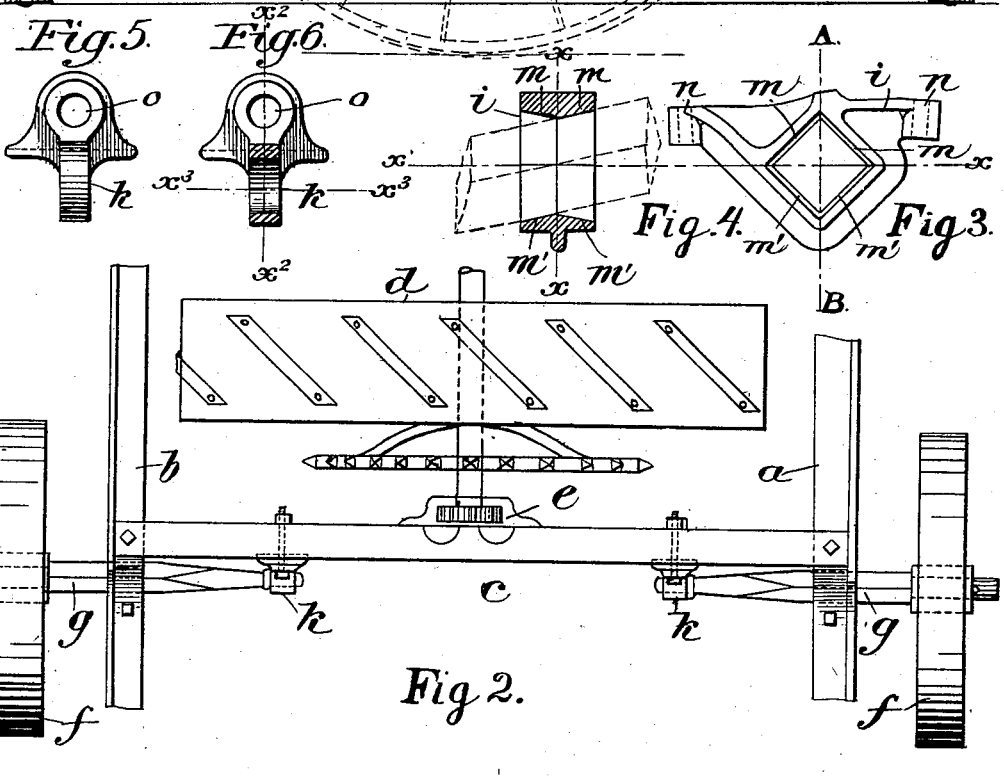
WITNESSES: INVENTORS.

No. 730,700. Patented June 9, 1903.

UNITED STATES PATENT OFFICE.

JOHN W. PRIDMORE AND BERT R. BENJAMIN, OF CHICAGO, ILLINOIS, ASSIGNORS TO INTERNATIONAL HARVESTER COMPANY, OF CHICAGO, ILLINOIS, A CORPORATION OF NEW JERSEY.

HARVESTER-TRUCK.

SPECIFICATION forming part of Letters Patent No. 730,700, dated June 9, 1903.

Application filed December 2, 1901. Serial No. 84,349. (No model.)

*To all whom it may concern:*

Be it known that we, JOHN W. PRIDMORE and BERT R. BENJAMIN, citizens of the United States, residing at Chicago, county of Cook, and State of Illinois, have invented certain new and useful Improvements in Harvester-Trucks; and we do hereby declare the following to be a full, clear, and exact description of the invention, such as will enable others skilled in the art to which it appertains to make and use the same.

It is quite common nowadays to provide agricultural or other machines, especially harvesters, which owing to their excessive width have to be drawn endwise along roads or through gates or other openings, with means for the temporary attachment thereto of supplemental truck-wheels by means of which the machines may be drawn from one place of use to another; and the object of the present invention is to provide an improved construction of attachable and detachable stub-axles for such wheels, together with means whereby the axles may be temporarily attached to the machines without the employment of special devices for securing them in place.

The invention is illustrated in the accompanying drawings, wherein—

Figure 1 is a stubble-end view of a harvester with our improved truck-wheels in position. Fig. 2 is a plan view of the same, illustrating the location of the truck-wheels and the bearing-brackets by means of which their axles are temporarily secured to the machine-frame. Fig. 3 is a front elevation of the bracket through which the main body portion of the axle passes. Fig. 4 is a cross-section of said bracket through the line A B of Fig. 3. Fig. 5 is a view of the bracket for the inner end of the axle corresponding to Fig. 3. Fig. 6 is a sectional view of this end bracket in the plane of the axis of its socket, and Fig. 7 is a top edge view of the outer bracket.

Referring to Figs. 1 and 2, $a$ and $b$ denote the lateral or cross sills of the machine-frame, and $c$ indicates one of the fore-and-aft sills. The main driving-wheel is indicated at $d$ and is arranged to be raised and lowered with respect to the machine-frame in bridles or guides, secured to the fore-and-aft sills, one of said bridles being denoted at $e$.

The truck-wheels are shown at $f$ and may be of any preferred pattern and construction. These wheels are journaled upon the outer ends of stub-axles $g$, which ends are cranked or dropped below the main length or body portion of the axles, as shown at $h$, for the purpose of securing the requisite height of the machine without the necessity of employing truck-wheels of large diameter.

As above noted, the employment of special devices to hold the truck-axles in position is dispensed with, and the main characteristic of the invention is that the axles are automatically held in place in their bearings by the weight of the machine, the axles being so constructed and positioned that this weight tends constantly to force them inwardly with respect to the machine and effectually holds them in place and prevents their accidental displacement while in use, and yet which permits them to be quickly and easily detached when the weight of the machine is transferred to the main wheel without the necessity of releasing any fastening devices or any movement of the axles other than drawing them straight out of their bearings. To this end the machine-frame has rigidly fastened to it or formed upon it two bearing-brackets for each axle, one, $i$, through which the main body portion of the axle passes and which is preferably secured to the under side of and depends from one of the cross-sills of the machine-frame, and the other, $k$, into which the inner end of the axle fits and which is preferably fastened to the fore-and-aft sill $c$. Each of these brackets is provided with a socket to receive and hold its axle, and the sockets are constructed, as will be hereinafter more particularly described, to fit the axles snugly, so that they have no movement therein other than the one necessary to insert or withdraw them in line with the socket's axis.

As illustrated in Fig. 1, the inner bracket $k$ is located in a plane above that of the outer bracket $i$, so that the axle when in place has a pitch or inclination inwardly and upwardly toward the center of the machine. The weight of the machine comes mainly upon the bracket $i$ and owing to the inclined position of the axle tends to slide outwardly therealong, or, what is, in effect, the same thing, tends to thrust the axle in the opposite direction or inwardly toward the center of the machine, thereby effectually holding the axle in position as long as the machine rests upon the truck-wheels. When, however, the main wheel $b$ is lowered and the weight of the machine transferred from the truck-wheels to its own supporting-wheel, there is no longer anything to hold the truck-axle in its bearing, and it and its wheel may be drawn endwise therefrom without particular effort.

As the outer portions of the truck-axles are cranked, as above described, it is necessary to provide some means for preventing them from turning in their bearings, and we avail ourselves of an old expedient for this purpose by making the outer portions of the axles angular in cross-section and making the sockets in the brackets through which this portion of the axles pass also angular. The inner end of the axles may or may not be angular in cross-section; but, whether made round, as herein illustrated, or angular, the sockets in the inner brackets $k$ should be similarly constructed.

We preferably make the axles square in cross-section, and the sockets in the brackets $i$ are also preferably square, and we prefer to arrange them diagonally, as shown in Fig. 3, so as to locate the greatest width of the axle in the plane of greatest resistance.

We believe it to be entirely new to utilize the weight of the machine as the sole means of holding the truck-axles in their bearings, and, so far as this mere effect is concerned, it is not material whether the axles are positioned in the manner above described or whether they be simply provided with an inclined portion or have an incline secured to them at the point where they pass through the outer brackets $i$. We prefer, however, to form the axles as shown in Fig. 1 of the accompanying drawings, where it will be seen that the main body portion is inclined at an oblique angle to the end where the truck-wheels are journaled, and it is advisable to form collars $l$ or flanges on their inner ends to abut against the brackets $k$ and prevent the weight of the machine from jamming the axles into these brackets so tightly as to prevent them from being readily withdrawn.

The sockets in the brackets are preferably closed on all sides, as best illustrated in Fig. 3, and for the purpose of coöperating with the incline of the axle we preferably provide the upper walls of the sockets with inclined surfaces $m$ to more effectually avail ourselves of the weight of the machine as the means for holding the axles in place. It is also desirable to provide the lower wall of the socket with an oppositely-inclined surface $m'$ on the opposite side of the median line of the bracket.

As will be seen from this description, the axle fits the socket snugly both on its upper and under sides. As above described, these axle-bearing sockets are preferably formed in separate bracket-castings, that are bolted or otherwise fastened in place on the frame of the machine. As these brackets are made in large quantities and as they sometimes require renewal, it is especially desirable that they be made so as to be reversible or applicable to right or left hand machines. We provide for this by making the brackets $i$ as more particularly illustrated in Figs. 3 and 4, where it will be seen that the inclined surfaces $m\ m'$ are duplicated on opposite sides of a plane $xx$, that passes centrally through the brackets and is perpendicular to the axis $x'\ x'$ of their sockets. This plane must also pass through the center of the bolt-holes or other point of attachment of the brackets to the frame-sills, as best shown in Fig. 7. As will be understood, the bolt-holes in the machine-frame or whatever other form of attachment is employed are located in the same relative position on right and left hand machines, and the object in constructing the brackets, as above described, with all their bearing-surfaces and points of attachment duplicated on opposite sides of the median line, is to enable them to fit other kinds of machines, so that they may be taken from stock at random, and any one may be substituted for a similar bracket on any given machine or any given bracket may be applied to either a right or left hand machine.

It is not important in the case of the inner brackets that their sockets should have the same inclined bearing-surfaces as are provided on the brackets $i$; but, if desired, they may be made with similar internal inclines, and in any event the inner ends of the axles are made to fit them snugly without play in any direction. These inner brackets are also made reversible, so as to be applicable to either kind of machine above described in precisely the same manner as explained in connection with the outer brackets—that is to say, both brackets are constructed so that the internal bearing-surfaces of the socket and the face of the bracket which fits against the part of the machine to which it is to be secured, as well as the bolt-holes by means of which it is fastened in place, must be exactly duplicated and equal in size, shape, and extent on opposite sides of a plane $x^2\ x^2$, that is perpendicular to the axis $x^3 x^3$ of the socket and passes centrally through the point or points of attachment of the bracket to the machine. This matter will be better understood by reference to Figs. 4 and 7, where, in the latter, a top edge view of the bracket $i$ is shown, so as to illustrate the division of the bracket into duplicate halves by a plane passing centrally through the two points of attachment $n\ n$, and in Figs. 4 and 6, where the formation of the bearing-surfaces of both sockets is shown as of exactly the same shape and dimensions and of opposite inclination on different sides of a plane passing through the single point of attachment $o$ in respect of the bracket $k$ or through the two points, as at $n$ $n$, as in the case of the bracket $i$.

In respect to the manner of holding the axles in the sockets of the brackets $i$ it is to be noted that it is entirely independent of any particular manner of getting them into the sockets or preventing them from turning after they get there—that is to say, it is unimportant, so far as this feature is concerned, whether the sockets are closed on all sides and the axles are inserted endwise or whether they are open below and the axles are simply passed upward therein—and, if desired, the sockets need not be angular, provided some other means be employed to prevent them from turning in case cranked or dropped axles be used or in case larger wheels are employed, when of course it would not be necessary to drop the axles below the brackets.

Having thus described our invention, what we claim is—

1. The combination with the frame of a harvester or other machine, of an attachable and detachable stub-axle for a truck-wheel, and a socket on the machine-frame adapted to receive and temporarily hold the axle, said axle having an inwardly and upwardly inclined surface on which the socket bears.

2. The combination with the frame of a harvester or other machine, of an attachable and detachable stub-axle for a truck-wheel, and a socket on the machine-frame adapted to receive and temporarily hold the axle, said socket having an outwardly and downwardly inclined interior surface, and the axle having an inwardly and upwardly inclined surface on its upper side.

3. An attachable and detachable stub-axle for the truck-wheels of harvesters or other machines, having that portion on which the weight of the machine rests extending inwardly at an obliquely-upward inclination to the end forming the axis of the wheel.

4. The combination with the frame of a harvester or other machine, of an attachable and detachable axle for a truck-wheel, a pair of sockets on the machine-frame to receive and temporarily hold the axle, the socket for the inner end of the axle being located in a higher plane than the one through which the body portion of the axle passes.

In testimony whereof we affix our signatures in presence of two witnesses.

JOHN W. PRIDMORE.
BERT R. BENJAMIN.

Witnesses:
WILLIAM WEBBER,
BERT BOWMAN.